United States Patent [19]

Beard

[11] Patent Number: 4,688,143
[45] Date of Patent: Aug. 18, 1987

[54] FUSE WELL AND HOUSING FOR PAD-MOUNTED, DOUBLE FUSED SWITCHGEAR

[75] Inventor: Lloyd R. Beard, Centralia, Mo.

[73] Assignee: A. B. Chance Company, Centralia, Mo.

[21] Appl. No.: 900,539

[22] Filed: Aug. 26, 1986

[51] Int. Cl.$^4$ .................... H02B 5/00; H02H 7/04
[52] U.S. Cl. ................................. 361/335; 361/41
[58] Field of Search ............. 361/335, 347, 349, 360, 361/430, 41

[56] References Cited

U.S. PATENT DOCUMENTS

| | | | |
|---|---|---|---|
| 2,736,598 | 2/1956 | Laffey | 292/338 |
| 3,078,001 | 2/1963 | Young et al. | 217/60 |
| 3,340,441 | 9/1967 | Probert | 361/335 |
| 3,522,404 | 8/1970 | Trayer | 200/144 B |
| 3,699,490 | 10/1972 | Macemon | 337/202 |
| 3,792,215 | 2/1974 | Keto | 361/41 |
| 3,863,187 | 1/1975 | Mahieu et al. | 337/162 |
| 4,083,028 | 4/1978 | Haubein et al. | 337/144 |
| 4,170,000 | 10/1979 | Trayer | 337/204 |

OTHER PUBLICATIONS

Trayer Engineering Corporation Drawings—Pad-mounted Vacuum Switchgear—3/1/1978.

Primary Examiner—Robert S. Macon
Attorney, Agent, or Firm—Schmidt, Johnson, Hovey & Williams

[57] ABSTRACT

An improved, lowcost double-fused vacuum switchgear apparatus designed for underground electrical distribution systems is provided which makes use of a specially configured oil tank-defining wall and insulative protective fuse well sleeves to give enhanced protection to workmen performing unauthorized energized servicing of the unit, while also using a minimum of dielectric oil and separate wall components. The preferred tank includes an oblique sidewall eliminating unnecessary oil space in the tank, while each fuse well is equipped with an insulative sleeve which guides fuse removal and installation and largely prevents short-circuiting even during energized servicing. The fuse assembly preferably includes a current-limiting fuse and a series-coupled expulsion fuse, the latter being oriented in the wells for directing conductive arcing gases downwardly and away from the switchgear components.

3 Claims, 6 Drawing Figures

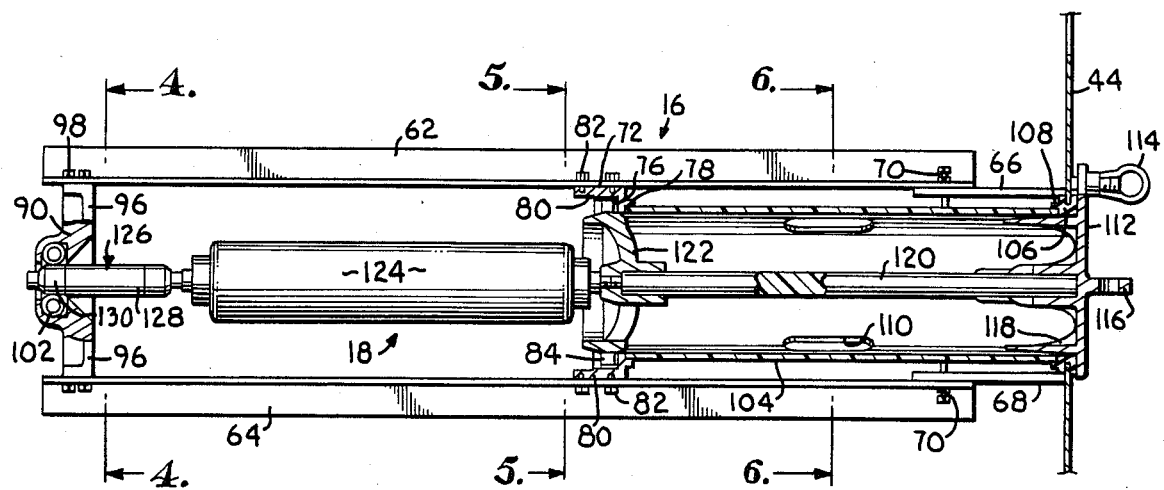
Fig.3.
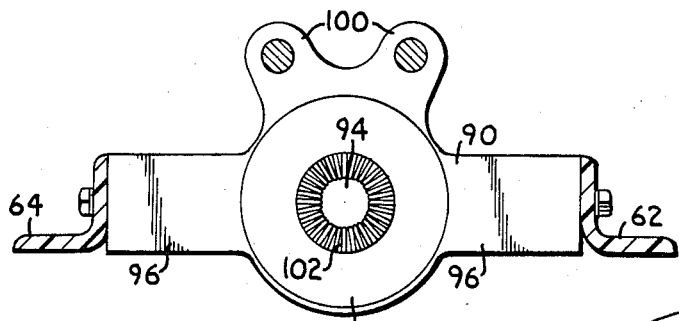
Fig.4.
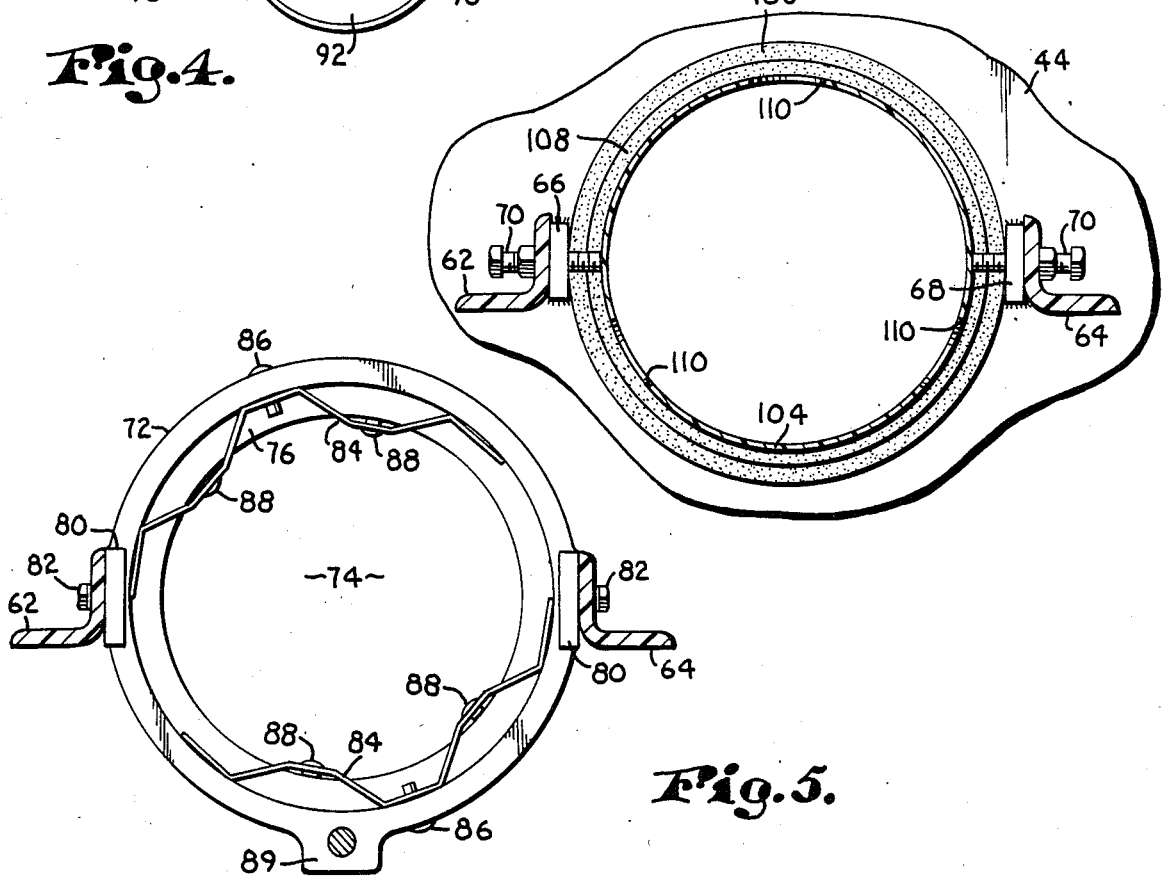
Fig.5.
Fig.6.

FUSE WELL AND HOUSING FOR PAD-MOUNTED, DOUBLE FUSED SWITCHGEAR

BACKGROUND OF THE INVENTION

1. Field of the Invention

The present invention is broadly concerned with a low cost, improved pad-mounted double-fused vacuum switchgear of the type described in U.S. Pat. No. 4,083,028. More particularly, it is concerned with such improved switchgear making use of a specially configured dielectric tank in comination with a low cost fuse well assembly which permits substantial reduction in material and fabrication costs while also giving equivalent and in some cases improved electrical characteristics.

2. Description of the Prior Art

U.S. Pat. No. 4,083,028 to Haubein et al. describes a pad-mounted double-fused switchgear apparatus designed to achieve fully coordinated, high rated electrical protection for underground electrical distribution systems. The switchgear apparatus described in the aforementioned patent represents a significant breakthrough in the art which has achieved considerable commercial success. The patented switchgear apparatus broadly includes a tank adapted to hold a fluid dielectric material such as oil together with plural vacuum switchgear devices and respective, series-coupled double-fuse protective assemblies. Each of the latter includes a current limiting fuse (CLF) and a series connected expulsion-type fuse link.

Field experience with such switchgear has demonstrated its ability to handle both high and low level faults without catastrophic explosions notwithstanding the fact that the switchgear is of relatively small, low profile design.

During routine maintenance or refusing of switchgear in accordance with U.S. Pat. No. 4,083,028, it is recommended that the secondary or tap side bushings be disconnected, whereupon the respective fuse assemblies can be readily removed from the tank without fear of short circuiting or electrical shock. Despite these recommendations however, certain individuals have attempted to service the switchgear without properly disconnecting the tap side bushings. Under such unauthorized conditions, it is possible that as the fuse assemblies are withdrawn a short circuit can occur between the intermediate contacts of the fuse well assemblies and the obliquely oriented upper metallic castings of the fuse wells.

The patented switchgear apparatus also makes use of a pair of upright, essentially parallel sidewalls, with the tap side sidewall having a plurality (usually six) metallic tubular castings affixed thereto and defining the upper ends of the fuse well assemblies. Such a construction is inherently expensive because of the need to separately fabricate the castings and attach them by appropriate means to the tank sidewall. Moreover, the rectangular construction of the tank, together with the oblique orientation of the fuse well and fuse assemblies therein, creates a relatively large zone or open space directly beneath the tap side bushings which must be filled with oil; this oil is essentially irrelevant to the operation and electrical characteristics of the switchgear, and hence represents added weight and materials serving no useful purpose.

SUMMARY OF THE INVENTION

The present invention represents a distinct improvement in the switch gear apparatus described in U.S. Pat. No. 4,083,028; as a consequence, this patent is incorporated by reference herein. In addition, the present invention overcomes the noted problems encountered during use of the patented switchgear.

Broadly speaking, the switchgear apparatus of the present invention includes a specially configured tank adapted to hold a liquid dielectric material (e.g. oil) which minimizes construction and material costs, while at the same time not detracting from the electrical protective function of the switchgear. Moreover, the apparatus of the invention includes a specially designed fuse well assembly which, in conjunction with the tank configuration, largely overcomes any problems associated with unauthorized servicing of the switchgear in an electrically energized condition.

In preferred forms, the tank of the switchgear has a pair of upright, spaced apart end walls and a continuous, metallic side and bottom wall-defining wall member extending between and being coupled to the end walls. The continuous wall member presents a downwardly and outwardly extending, obliquely oriented, apertured fuse assembly panel adjacent the top margin thereof, and a downwardly and inwardly extending obliquely oriented first sidewall panel. The continuous wall member also has a bottom panel which is generally horizontal and an upright second sidewall panel.

The apparatus includes a plurality of elongated, laterally spaced apart fuse well assemblies within the confines of the tank and respectively in alignment with an associated fuse well panel aperture. Each of the assemblies has a pair of elongated, laterally spaced apart, electrically insulative supports, typically in the form of angles. Such supports are fixedly secured to the tank-defining member with the longitudinal axes of the supports substantially parallel with the axis of the associated entrance aperture and in general alignment with the obliquely oriented first sidewall panel. Respective spaced apart intermediate and lower contact bodies are coupled to the supports, with each of the contact bodies presenting an opening therethrough and carrying an electrical contact.

In order to provide enhanced protection against inadvertent electrical shock or short circuiting in the event of unauthorized maintenance of the switchgear in an energized condition, a thin, tubular, electrically insulative element is secured and extends between the intermediate contact body and the underside of the fuse assembly panel. This insulative guide is advantageously slotted in order to permit free flow of dielectric therethrough.

The overall fuse assembly is configured and arranged for receiving a fuse assembly between the intermediate and lower contact bodies. The fuse assembly includes a series coupled current limiting fuse (CLF) and expulsion fuse tube, the latter defining the lowermost end of the assembly and being received in the aperture of the lower contact body. A bayonet assembly is affixed to the upper end of the CLF and has an uppermost metallic cap designed to mate with the fuse well entrance aperture. A pair of attachment screws are provided with the cap for securing the same to the fuse assembly panel and creating an oil-tight seal.

During operation of the fuse assembly, particularly during the clearing of low level faults, high temperature conductive gases are expelled downwardly through the lower contact body opening. In order to safely accommodate such operation, the lower contact body is spaced from the adjacent lower margin of the first sidewall panel and the bottom panel for providing sufficient dielectric material beneath the fuse assembly to absorb the conductive gases and permit safe operation without short circuiting.

Finally, the apparatus of the invention includes an electrical vacuum switch for each fuse well assembly mounted within the tank below the normal level of dielectric and coupled in series with a respective associated fuse well assembly. In this fashion the switchgear has a number of switch-fuse well assembly combinations. Appropriate source and load bushing devices are provided for each of the switch-fuse well assembly combinations. These bushing devices respectively extend through the tank-defining wall member and are electrically connected in series with the associated combination. In practice, each source side bushing is connected to an adjacent switch, the latter being in turn connected to the lower fuse assembly contact. The load side bushing on the other hand is connected in series to the intermediate contact of the associated fuse well assembly.

BRIEF DESCRIPTION OF THE DRAWINGS

FIG. 3 is a fragmentary view in partial vertical section illustrating the details of construction of one of the fuse well and double-fuse assemblies;

FIG. 4 is a sectional view taken along line 4—4 of FIG. 3 and illustrating the details of construction of the lower contact body of the fuse well assembly;

FIG. 5 is a view taken along line 5—5 of FIG. 3 and illustrating the preferred intermediate contact body of the fuse well assembly; and FIG. 6 is a view taken along line 6—6 of FIG. 3 and depicting the tubular insulative sleeve forming a part of the fuse well assembly.

DESCRIPTION OF THE PREFERRED EMBODIMENT

Figure 1:
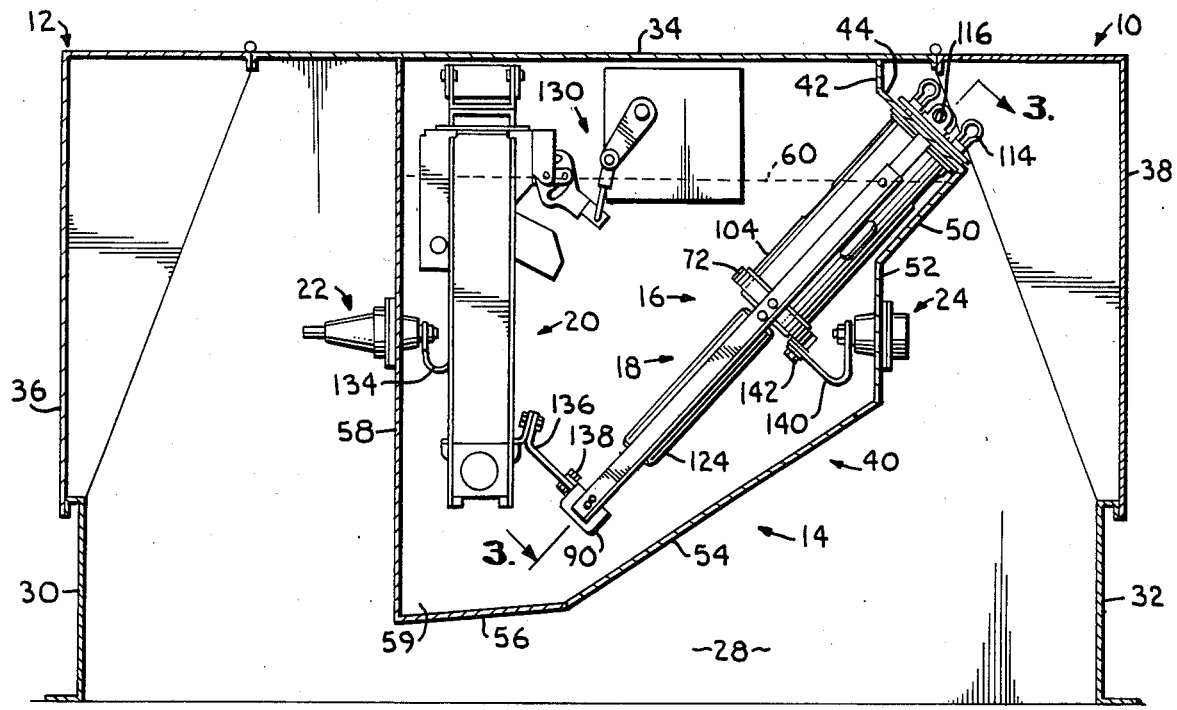
FIG. 1 is a vertical sectional view illustrating the internal construction of the preferred pad-mounted switchgear apparatus of the invention.
Figure 2:
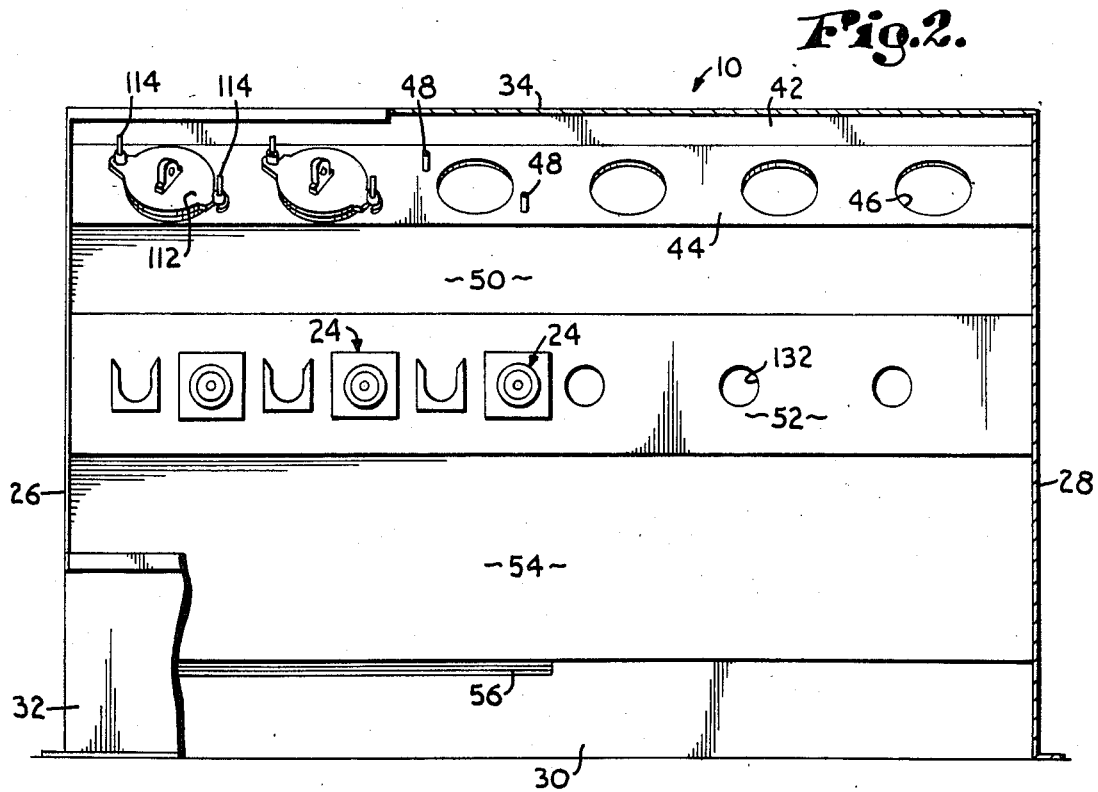
FIG. 2 is a fragmentary side view in partial vertical section illustrating the load side of the switchgear apparatus depicted in FIG. 1, with a pair of fuse assemblies in place in associated fuse wells.

Turning now to the drawings, a double-fused pad-mounted vacuum switchgear in accordance with the invention is illustrated in FIGS. 1 and 2 and is broadly referred to by the numeral 10. Switchgear 10 includes an outermost casing 12 housing an internal oil filled tank 14 of specialized construction. The tank 14 moreover includes a plurality (here six) of laterally spaced apart, obliquely oriented fuse well assemblies 16 each receiving an associated double-fuse protective assembly 18. A series of vacuum switches 20 are situated within tank 14 respectively in series-coupled relationship with an associated fuse well assembly 16. Finally, each switch-fuse well assembly combination is provided with a source or primary bushing 22 and a load or tap bushing 24, the latter extending through adjacent portions of the tank-defining walls as illustrated.

In more detail, the overall switchgear apparatus 10 is designed to be mounted on a concrete or similar pad (not shown) with the walls of casing 12 being affixed thereto. Preferably, the switchgear 10 is of the dead-front variety, i.e., all metallic walls thereof are at ground potential. The casing 12 has a pair of upright, spaced apart end walls 26, 28 together with short, upstanding, interconnecting front and rear walls 30, 32. The casing also has a top wall 34 secured to end walls 26, 28 and supporting hingedly connected front and rear openable covers 36, 38. As those skilled in the art will appreciate, opening of the covers 36, 38 permits selective access to the internals of switchgear 10 and particularly the source and load side bushing and the respective fuse assemblies 18.

Tank 14 includes, in addition to portions of the sidewalls 26, 28 and top wall 34, a specially configured, continuous metallic wall member broadly referred to by the numeral 40. The wall member 40 extends between and is connected to the sidewalls 26, 28, and to top wall 34, in order to provide a closed, oil-tight compartment.

The tank-defining wall member 40 includes a short, uppermost, vertically extending stretch 42 and a somewhat longer, obliquely oriented, downwardly and outwardly extending fuse assembly panel 44. The latter is provided with a series of laterally spaced apart fuse well entrance apertures 46 (see FIG. 2) along with a pair of opposed, upstanding threaded connection studs 48 adjacent each of the apertures 46.

The wall member 40 further has an obliquely inclined, downwardly and inwardly extending wall portion 50 which is in parallel, closely spaced relationship to the associated fuse well assemblies 16 later to be described. An essentially vertical load bushing panel 52 extends downwardly from the wall portion 50 as shown, and has a downwardly and inwardly extending, obliquely oriented first sidewall panel 54 secured to the bottom margin thereof. The wall member 40 is completed by provision of a generally horizontally extending bottom panel 56 and an upright, substantially vertical second sidewall panel 58, the latter being apertured to receive the source side bushings 22. The wall 56 is oriented at approximately a 5° angle relative to the horizontal, so as to define with wall 58 a low region 59 for collection of water or contaminant solids.

As indicated, the tank 14 is designed to hold a quantity of fluid dielectric material such as oil. The normal level of oil within the tank 14 is shown at 60 (see FIG. 1), and is designed to completely submerge the series-connected fuses of the assemblies 18, and the respective vacuum switches 20.

Attention is next directed to FIGS. 3–6 which depict the preferred fuse well assemblies 16 as well as the associated double-fuse assemblies 18. Each assembly 16 includes a pair of opposed, laterally spaced apart insulative angles 62, 64 advantageously formed of glass fiber reinforced epoxy material. These supports are fixedly attached to the overlying fuse assembly panel 44 by means of a pair of metallic straps 66, 68. Connection between the straps 66, 68 and the associated supports 62, 64 is effected by means of threaded connectors 70. It will further be noted that the supports 62, 64 are oriented with the longitudinal axes thereof being substantially parallel with the axis of the associated fuse well entrance aperture 46; moreover, it will be seen that the axes of the supports are generally aligned (although not precisely parallel) with the first sidewall panel 54.

An intermediate contact body 72 is secured to the supports 62, 64 between the ends thereof. The body 72 (see FIGS. 3 and 5) is generally in the form of an annular ring presenting a fuse-clearing central opening 74 therethrough. Further, the annular body presents an inwardly extending segment 76 and an integral, upwardly extending annular wall 78 which is important for purposes to be described. Finally, a pair of integral connection tabs 80 form a part of the body 72, in order to permit connection of the body 72 to supports 62, 64 by means of threaded fasteners 82. Referring particularly to FIG. 5, it will be seen that the annular region beneath the wall segment 76 houses a pair of metallic spring contacts 84. Each of the contacts 84 is affixed to the body 72 by means of a rivet 86, and further presents a pair of innermost contact buttons 88. Finally, it will be noted that an apertured line connection ear 89 is integral with the body 72.

A lower contact body 90 is also secured to the lower ends of the supports 62, 64. As best seen in FIG. 4, the contact body 90 includes an annular central portion 92 defining an innermost aperture 94. A pair of laterally extending connection ears 96 are also provided, and threaded fasteners 98 are employed to fixedly secure the body 90 to the supports 62, 64. Finally, a pair of apertured connection tabs 100 are also integral with the central annular portion 92. A garter spring contact 102 is housed within the body 90 to provide a biased electrical contact with the lowermost fuse tube of an assembly 18 as will be described.

The fuse well assembly 16 also includes a thin, tubular, electrically insulative element 104 which is situated between intermediate contact body 72 and fuse assembly 44 in surrounding relationship to the associated entrance aperture 46. The lower end of the element 104 fits within and abuts the annular wall 78 of intermediate contact body 72 to provide a stable base for the element. The upper end of the element 104 engages an annular resilient gasket 106 seated within the associated entrance aperture 46 (see FIG. 3). It will be observed that the gasket 106 is especially configured for a mating fit with the aperture-defining margin of the panel 44, and moreover has a depending annular portion 108 assuring a secure fit with the upper end of the element 104. Finally, the tubular element 104 is provided with three circumferentially spaced apart slots 110 therethrough which permit free flow of dielectric into and out of the cylindrical space defined by the element. Although not essential, it is preferred that the innermost ends of the threaded fasteners 70 abut element 104 as shown in FIG. 6, in order to provide further stabilization for the element.

Each double-fuse assembly 18 includes an uppermost apertured cap 112 provided with a pair of attachment screws 114 adapted to receive the studs 48 and a central eye 116 permitting handling of the complete assembly 18 through the use of hotline tools. The cap 112 further has a plurality of downwardly extending guide flanges 118 which facilitate final placement of the assembly within an associated fuse well assembly 16. An elongated insulative bayonet rod 120 is secured to the underside of cap 112 and supports, at the lower end thereof, a circular metallic contact 122. The contact 122 is configured to be received within annular intermediate contact body 72 and make electrical contact with the contacts 84 carried thereby.

A current-limiting fuse 124 of conventional construction is threadably and electrically connected to the underside of contact 122. The fuse 124 is in longitudinal alignment with bayonet rod 120 as shown. A second, low fault clearing expulsion fuse 126 is connected in series with CLF 124 and is likewise in alignment with the CLF and rod 120. Fuse 126 is of known construction and includes a hollow, open ended fuse tube 128 carrying a lowermost contact 130 designed to make electrical contact with garter spring contact 102. An expulsion-type fuse link (not shown) is situated within the confines of tube 128 and is electrically coupled in series between contact 130 and CLF 124. As best seen in FIG. 3, the lower open end of tube 128 is received within the aperture 94 of lower contact body 90 so that conductive gases generated during melting of the fuse link are directed downwardly and away from fuse assembly 18.

As described previously, the overall switchgear 10 is provided with a plurality of vacuum switch elements 20, one for each fuse well assembly 16. Broadly speaking, each such switch element 20 includes a vacuum housing having a pair of separable electrical contacts therein. Mechanism referred to by the numeral 130 is provided for selective gang operation of the switch elements 20 in order to open and close the internal contacts therein and thereby selectively break or establish current paths through the switchgear as desired. While a wide variety of vacuum switch elements can be used in the context of the invention (such as those fully described in U.S. Pat. No. 4,083,028), it is particularly preferred to utilize switch elements of the type described in Application for U.S. Letters Patent entitled "Three Phase Vacuum Switch Operating Mechanism With Anti-Bounce Device for Interrupter Contact", in the name of Eugene L. Kamp and owned by the assignee of this application. The above-mentioned Kamp application, filed on the same day as the present application, is expressly incorporated by reference herein.

The primary or source side bushings 22 are provided through appropriate apertures in second sidewall panel 58. These bushings are entirely conventional and well known in the art. In like manner, the load side bushings 24 are situated within appropriate apertures 132 provided in vertical wall portion 50. These bushings are also of the well known variety.

In order to complete the electrical paths through the switchgear 10 for each fuse well-switch combination, a conductive strap 134 is provided between the inner end of each source side bushing 22 and its associated switch element 20. Moreover, a conductive strap 136 is provided between the load side of each switch and the lower contact body 90 of the adjacent assembly 16. In this respect, use is made of the apertured tabs 100 provided with the contact body 90, and appropriate threaded connectors 138, in order to effect the desired electrical connection. Finally, a conductive strap 140 is provided between intermediate contact body 72 and the inboard end of the associated loadside bushing 24. Here again, connection of the strap 140 to the body 72 is made using the apertured connection ear 89 and fastener 142.

In the preferred form of the invention, the current-limiting fuse 124 is of the high range variety (i.e., constructed to actuate only during high level faults) and is of the type disclosed in U.S. Pat. No. 3,863,187. On the other hand, the expulsion fuse 126 is of a type which is designed to actuate in response to a relatively low level fault, and also to a rise in temperature within the tank in order to prevent thermal damage to the switchgear. The CLF and expulsion fuse are advantageously designed such that during relatively high fault current conditions (above 2000 amps), only the CLF will actuate and not the expulsion fuse.

In the normal operation of switchgear 10, current from a underground distribution main (not shown) passes through source bushing 22, strap 134, switch element 20, strap 136, contact body 90, the series-connected fuses 126, 124, contact body 72, strap 140 and source bushing 24, this being the case for each respective switch-fuse combination within the device. In the event of a high level fault, the current-limiting fuses 124 will actuate in the known manner to quickly clear the fault before damage is done, and in preferred forms the expulsion fuses 126 will not actuate during such a high level fault occurrence. In the case of the more common low level faults, the fuses 124 will clear the fault by melting or severing in the conventional way. During such operation of the low level fuses 126, high temperature, conductive gases are generated. Such gases are expelled downwardly and away from the series-connected fuses 124, 126, in order to prevent envelopment of the fuses with such gases and the possibility of a flash-over between the intermediate and lower contact bodies 72, 90. In this connection, it will be seen that the lower margin of sidewall panel 54 and bottom panel 56 are strategically arranged in order to provide sufficient dielectric beneath the lower contact 90 and the switch elements 20 to absorb the conductive gases without fear of short circuiting between lower contact 90 and the tank wall for example. At the same time, the provision of sidewall panel 54 in general alignment with the longitudinal axes of the fuse well assembly 16 assures that only a minimum of oil is present in tank 14, thus producing a savings in material and weight.

In the event that the assemblies 18 actuate to clear a fault, or in the case of routine maintenance, the assemblies 18 can be readily removed from their associated wells for refusing or servicing. In order to accomplish this, the tap bushings 24 are disconnected from the switchgear 10, screws 114 are loosened, and each entire double-fuse assembly 18 is removed from its associated well. Upon refusing, it is only necessary to slide the complete assembly downwardly through the entrance aperture 46 and into the confines of the tubular element 104 until the lowermost end of fuse tube 128, and particularly contact 130, seats within lower contact body 90. At the same time, the intermediate contact 122 carried by bayonet rod 120 will come into electrical contact with intermediate contact body 72.

If a serviceman disregards the instructions to disconnect the tap bushings 24 from the switchgear, and seeks to service switchgear 10 under a live condition, the provision of tubular element 104 and the specially configured tank wall member 40 minimize the possibility of inadvertent short circuiting and/or electrical shock.

A particular advantage of the switchgear of the invention resides in the fact that it can be manufactured at significantly reduced costs. Use of the continuous formed tank wall 40, and the elimination of separate fuse well entrance castings, give cost advantages without corresponding performance losses.

In other embodiments, use can be made of the described tank and fuse well structure to provide a fusing device without associated internal switchgear. Such a fusing unit would include appropriate electrical connectors directly between the respective bushings 22 and the lower contacts 90, the intermediate switches being entirely eliminated.

I claim:

1. Padmounted, deadfront, fuse-protected switchgear apparatus, comprising:

a tank adapted to hold a liquid dielectric material and including a pair of upright, spaced apart end walls and a continuous, metallic side and bottom wall-defining member extending between and being coupled with said end walls, said member presenting a downwardly and outwardly extending, obliquely oriented, apertured fuse assembly panel adjacent the top margin thereof, a downwardly and inwardly extending, obliquely oriented first sidewall panel, a bottom panel, and an upright second sidewall panel;

a plurality of elongated, laterally spaced apart fuse well assemblies within the confines of said tank and respectively in alignment with a fuse well panel aperture, each of said fuse well assemblies including a plurality of elongated, laterally spaced apart, electrically insulative supports;

means fixedly securing said supports to said member with the longitudinal axes of the supports being substantially parallel with the axis of the associated aperture and generally aligned with said first sidewall panel;

an intermediate contact body presenting a fuse assembly-clearing opening therethrough and carrying an electrical contact, said intermediate contact body being coupled to said supports intermediate the ends thereof;

a lower contact body presenting a fuse tube-receiving opening therethrough and carrying electrical contact, said lower contact body being attached to said supports adjacent the lower ends thereof and in spaced relationship to said intermediate contact body; and a thin, tubular, electrically insulative element secured and extending between said intermediate contact body and the underside of said fuse assembly panel in surrounding relationship to said associated aperture, said assembly being configured and arranged for receiving a fuse assembly between said intermediate and lower contact bodies with the fuse assembly having a lower, open-ended fuse-receiving tube oriented to fit within the opening defined by said lower contact body, said lower contact body being spaced from the lower margin of the first sidewall panel and said bottom panel for providing sufficient dielectric material beneath the fuse assembly to permit safe operation of the fuse assembly without short-circuiting;

an electrical vacuum switch for each fuse well assembly;

means mounting each of said switches within said tank;

means electrically coupling each of the switches in series with a respective associated fuse well assembly to present a number of switch-fuse well assembly combinations; and separate source and load bushing devices for each of said switch-fuse well assembly combinations, respectively extending through said member and being electrically connected in series with the asssociated combination.

2. The apparatus of claim 1, said bottom panel being oriented at a small angle relative to the horizontal for defining, with said second sidewall panel, a low region in said tank for collection of water and contaminants.

3. Padmounted, fusible apparatus, comprising:

a tank adapted to hold a liquid dielectric material and including a pair of upright, spaced apart end walls and a continuous, metallic side and bottom wall-defining member extending between and being coupled with said end walls, said member presenting a downwardly and outwardly extending, obliquely oriented, apertured fuse assembly panel adjacent the top margin thereof, a downwardly and inwardly extending, obliquely oriented first sidewall panel, a bottom panel, and an upright second sidewall panel;

a plurality of elongated, laterally spaced apart fuse well assemblies within the confines of said tank and respectively in alignment with a fuse well panel aperture, each of said fuse well assemblies including a pair of elongated, laterally spaced apart, electrically insulative supports;

means fixedly securing said supports to said member with the longitudinal axes of the supports being substantially parallel with the axis of the associated aperture and generally aligned with said first sidewall panel;

an intermediate contact body presenting a fuse assembly-clearing opening therethrough and carrying an electrical contact, said intermediate contact body being coupled to said supports intermediate the ends thereof;

a lower contact body presenting a fuse tube-receiving opening therethrough and carrying electrical contact, said lower contact body being attached to said supports adjacent the lower ends thereof and in spaced relationship to said intermediate contact body; and a thin, tubular, electrically insulative element secured and extending between said intermediate contact body and the underside of said fuse assembly panel in surrounding relationship to said associated aperture, said assembly being configured and arranged for receiving a fuse assembly between said intermediate and lower contact bodies with the fuse assembly having a lower, open-ended fuse-receiving tube oriented to fit within the opening defined by said lower contact body, said lower contact body being spaced from the lower margin of the first sidewall panel and said bottom panel for providing sufficient dielectric material beneath the fuse assembly to permit safe operation of the fuse assembly without short-circuiting; and separate source and load bushing devices for each of said fuse well assemblies, respectively extending through said member and being electrically connected in series with the associated fuse well.

* * * * *